1083X
D. DEWEY.
CLOTH SHEARING MACHINE.
Patented June 27, 1809.
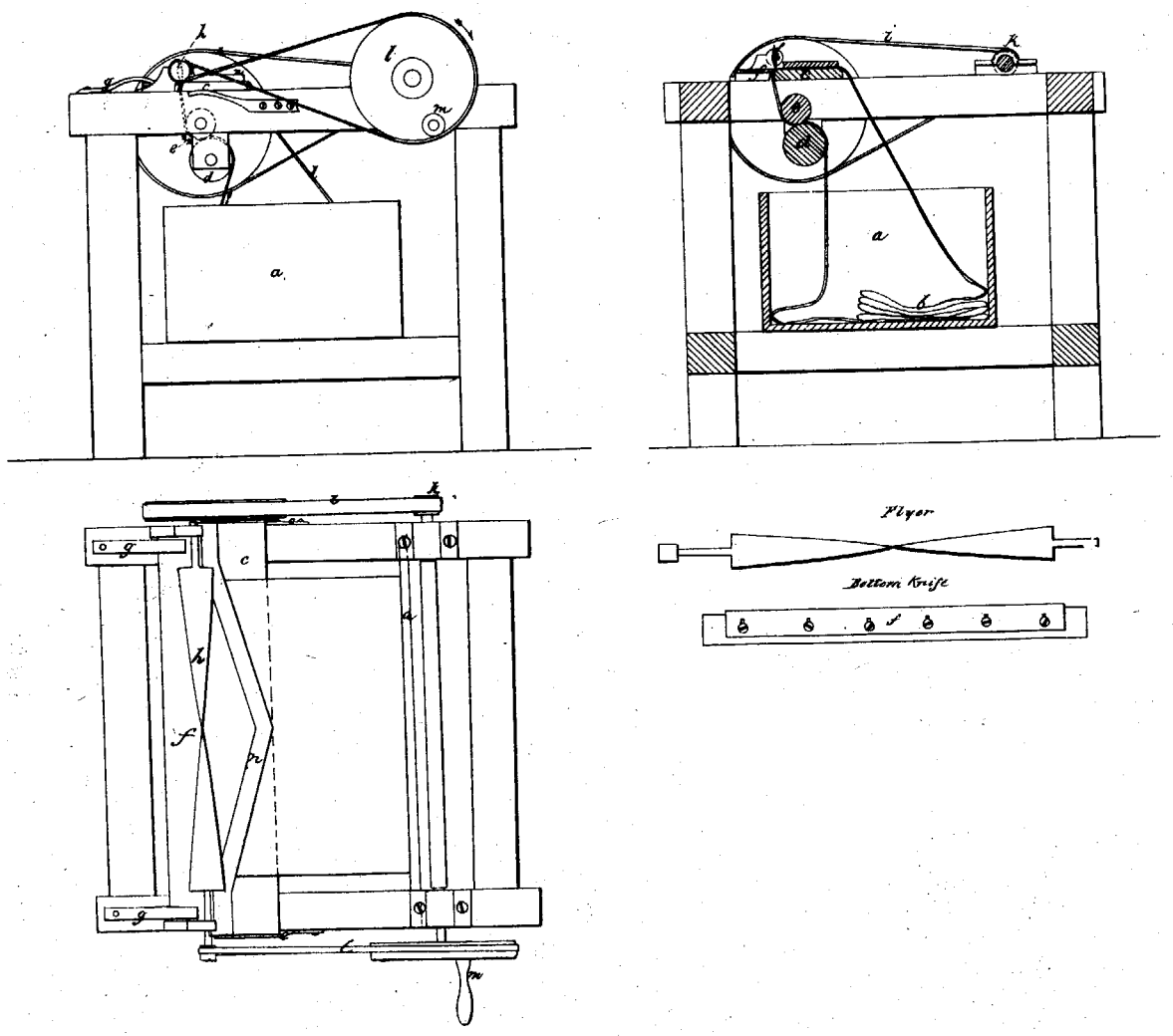
THE NORRIS PETERS CO., PHOTO-LITHO., WASHINGTON, D. C.

David Dewey. 1083X

Letters Patent.

Issued June 27. 1804.

The Schedule referred to in these Letters Patent and making part of the same containing a description in the words of the said David Dewey. of his Machine for shearing Cloth.

This Machine consists of a square frame composed of four upright posts 3.ft 3.in high united by four birth[s] at top & four toward the bottom on which stands a box to contain the cloth which stands crossways of the frame which must be of sufficient width to admit the cloth which is pass'd out of sd box upward over a shearing board & down between two rollers wh draw the cloth over end, the horizontal blade or knife is placed on the upper side of a board wh lies across the frame from birth to girth with the edge brought close to the cloth as it breaks over the shearing board, wh is gauged by springs as is the horizontal blade. suppose the frame to stand North & South the blades are towards the North end. The flyer is about from 3 to 4 inches in width & suspended over the other blade by a pivot at each end said flyer is made with two edges in shape like a curriers knife & twisted so that when one edge is done operating the other has advanced a number of inches. said flyer is turned by a cross band from a Wheel of about 18in: diam.r suspended on a shaft which lies across the top of the frame about 3ft from the flyer. on the other end of the shaft is a whirl about 3 In: diam.r wh turns a wheel of equal size with the former wh is on the end of one of the before mentioned rollers. The Machine is put in motion by the performer who stands at the North west corner of the frame & turnes by a pin in the first mentioned wheel on the upper side of the shearing board wh is about 10in: wide, is placed a clasp wh presses down upon the cloth in the form of a triangle with the point foremost wh spreads the cloth to its full width and delivers it smooth and even to the sheirs The

342.

1083x

The two ends of the cloth are tacked together, & is delivered into the same box out of wh. it is taken.—

Test

Wm. Simpson } Stephen Cruttenden
Timothy Cruttenden

David Drury

Drury made Sl. Nov.